United States Patent [19]

Brodmann

[11] 3,961,978

[45] June 8, 1976

[54] PROCESS FOR PRODUCING PERLITE MICROSPHERES

[75] Inventor: Franz J. Brodmann, Philadelphia, Pa.

[73] Assignee: General Refractories Company, Bala Cynwyd, Pa.

[22] Filed: Sept. 20, 1974

[21] Appl. No.: 507,702

[52] U.S. Cl. .................... 106/288 B; 106/DIG. 2; 106/40 R; 252/378 P
[51] Int. Cl.² ................... C09C 1/28; C04B 31/22
[58] Field of Search ......... 106/288 B, DIG. 2, 40 R; 252/378 P

[56] References Cited
UNITED STATES PATENTS

| | | | |
|---|---|---|---|
| 2,977,240 | 3/1961 | Houston | 106/288 B X |
| 3,458,332 | 7/1969 | Alford et al. | 106/288 B X |
| 3,752,685 | 8/1973 | Honda et al. | 106/288 B |
| 3,810,773 | 5/1974 | Shannon | 106/288 B |

FOREIGN PATENTS OR APPLICATIONS

| | | | |
|---|---|---|---|
| 913,373 | 12/1962 | United Kingdom | 252/378 |

*Primary Examiner*—Patrick P. Garvin
*Assistant Examiner*—William G. Wright
*Attorney, Agent, or Firm*—Everett H. Murray, Jr.

[57] ABSTRACT

Perlite reduced to a particle size of less than 200 mesh in a binder of aqueous sodium ligno-sulfonate is expanded while suspended in a gaseous medium in a fluidized state at temperatures ranging from 1800° to 2200°F. for a period of 30 to 60 seconds. The resultant microspheres have excellent physical properties and are suited to use as fillers for resins.

3 Claims, No Drawings

PROCESS FOR PRODUCING PERLITE MICROSPHERES

The present invention relates to a method for the manufacture of low-density hollow spheres of small particle size from perlite. More particularly, it relates to a method for the production of closed, hollow spheres of perlite having high strength and physical properties.

It has been known to prepare small, hollow closed spheres of glass, frequently referred to in the art as micro-balloons or microspheres, for a wide variety of purposes. Included among these, and probably most common, is the employment of such low-density materials as lightweight fillers for polymers, cements and the like, as a low-cost extender and/or as a technique for reducing weight.

Because of the relatively complex and costly processing techniques required for the preparation of such hollow glass spheres, it has been proposed to prepare such materials by the expansion of perlite or perlitic rock.

Perlite and other perlitic material include a variety of volcanic siliceous glasses containing generally about 2 to 6 percent by weight bound water which, when heated at elevated temperatures, releases such water to expand or "pop" the mineral into a lightweight mass.

It has heretofore not proved possible or practical to obtain closed cell spherical particles of expanded perlite having satisfactory physical properties for utilization as a low-cost substitute for "microballooons" or "microspheres" of glass. Notably, known efforts to produce hollow glass spheres of perlite have resulted in large size spheres unsuited for contemplated usages, and drastically inferior strength. In addition, large proportions of the resulting spheres will not be hole free, and are accordingly not useful as resin fillers. No technique heretofore employed has proved effective to provide small, hole-free hollow microspheres having appropriate physical properties for use as resin filler material.

It is accordingly an object of the present invention to provide a method of forming small, hole-free hollow microspheres from perlite and like glasses.

A further object is to provide microspheres of perlite having properties suited to use as a resin filler material and other such applications demanding superior physical properties.

These and still other objects, to become apparent from the following disclosure, are attained by the present invention which is characterized by the following procedure.

Mined lump perlite is reduced in size to less than about 200 mesh, blended with sodium lignosulfonate in water, and expanded at low residence times at a temperature of at least about 1800°F., and up to about 2200°F., while in a fluidized state. It is preferred that fractions having a particle size of less than about 325 mesh be agglomerated with the lignosulfonate binder to provide an agglomerate size in the range of about 200 to 325 mesh. It is also preferred that the microspheres be produced from a fairly narrow range of particle sizes to enhance the uniformity of the product.

The reduction of lump perlite can be accomplished by any convenient technique from among the many known to those of ordinary skill in the art. A convenient means would include a first crushing operation in a jaw crusher, followed by a final reduction in a hammer mill. By such operations, large proportions are reduced to less than 200 mesh. After separation of oversize material, the crushed perlite will be preferably further separated into at least ± 325 mesh fractions and, more preferably yet, into several fractions having relatively narrow particle size distribution. A convenient distribution, for example, would be fractions of less than 200 but larger than 270 mesh, less than 270 and larger than 325 mesh, and less than 325 mesh. Separation into such fractions is well within the ordinary level of skill in the art. The fractionation of the particles serves to increase the uniformity of the final products and if such uniformity is not required, the operation may be omitted with consequent savings.

Agglomeration of the −325 mesh material is also a well known operation to those of ordinary skill in the art. A convenient technique employs the lignosulfonate binder applied to the particulate which is then mixed, as by tumbling in a V-blender rotation disc or the like.

The particulate material is expanded in a fluidized state at temperatures in the range of about 1800° to 2200°F. for relatively low residence times, i.e. less than about 2 minutes and usually in the range of about 30 to 60 seconds. The conditions are such that the particles or agglomerates, as the case may be, will be expanded without fusing with other particles or agglomerates, thus resulting in a preponderance of single sphere particles and will attain a hole-free low-density structure having a diameter on the order of 10 to 200 microns and a wall thickness of about 0.7 to 1.5 microns. Such particles have both chemical and physical properties suitable for such demanding uses as fillers for resins and the like. The expansion operation according to the present invention can conveniently be accomplished by feeding the particulate into a gas-fired or electrically heated (arc) verticle tube furnace operated at the appropriate temperature. In operation, the particles are suspended in the rapidly moving gases in the furnace in a fluidized state and there are expanded to low density microspheres which are carried out of the furnace and recovered from the combustion gases in any convenient fashion as, for example, in a centrifugal separator such as a cyclone or the like or by a bag-filter or other such known techniques. Still other techniques will be readily apparent to those of ordinary skill and the choice of a particular technique can be made on the basis of convenience and availability of appropriate equipment and like factors.

The resultant spheres, obtained by the process of the present invention, have excellent physical properties and are suitable for use as a low-density filler for resins and the like. The nominal loose-weight density (LWD) will range from about 2.5 to about 6.0 pounds per cubic foot, having a particle size diameter (MPS) of about 10 to 200 microns and a wall thickness of about 0.7 to 1.5 microns. Closed hollow structure is attained as observed by flotation on water of substantially 100% of the expanded material. Friability, as determined by processing for 10 minutes in a Silbrico Standard Friometer, will be substantially zero.

A preferred product is obtained from the expansion in accordance with the present invention of an agglomerate of perlite particles less than 325 mesh, where the agglomerate (formed by mixing the particles with the lignosulfonate binder) have an aggregate size of about 200 to 270 mesh. The physical properties of the expanded product are exceptionally suited for usages such as resin fillers and the like, exhibiting near optimum values of all the relevant parameters.

EXAMPLES

Perlite ore lumps having the chemical composition shown in Table 1 were crushed in a jaw crusher and then further reduced in a hammer mill. The resultant particulate was separated into fractions of −200+270 mesh, −270+325 mesh, and −325 mesh. A separate portion was screened to provide a +270 mesh sample containing particles of larger than 200 mesh in substantial proportion, and the fines were further separated into ±400 mesh fractions. These materials are those referred to in the following Examples, which are illustrative of the present invention and not, therefore, intended to be limiting on the scope of the invention.

TABLE I

Chemical Comp. of Perlite Ore and Separated Fractions

|  | Lump Ore | Fraction −325 +400 mesh | Fraction −400 mesh |
|---|---|---|---|
| $SiO_2$ | 73.40 | 73.52 | 73.36 |
| $Al_2O_3$ | 12.96 | 13.02 | 13.49 |
| $TiO_2$ | 0.01 | 0.01 | n.d. |
| $Fe_2O_3$ | 0.62 | 0.62 | 0.89 |
| CaO | 0.45 | 0.43 | 0.29 |
| MgO | 0.03 | 0.03 | 0.25 |
| $Na_2O$ | 5.60 | 5.20 | 4.42 |
| $K_2O$ | 4.56 | 4.64 | 4.90 |
| $Li_2O$ | 0.04 | 0.04 | 0.01 |
| L.O.I. | 2.83 | 3.00 | 1.33 |
| Total Flux | 14.14 | 13.97 | 12.09 |

EXAMPLE I

The 200 to 270 mesh material described above was fed into a gas fired verticle tube furnace at a temperature of 1800°F. The particles were expanded and the expanded material was carried from the furnace by the combustion gases after a residence time of about 30 to 40 seconds. The expanded material was examined for its physical characteristics which are reported in Table II, infra.

EXAMPLE II

The 270 to 325 mesh fraction of perlite was processed and examined as in Example I. The results are shown in Table II.

EXAMPLE III

In the preferred embodiment of the present invention, the fraction of the perlite of Table II of less than 325 mesh was agglomerated with aqueous sodium lignosulfonate in a V-blender, resulting in an agglomerate size of about 200 to 270 mesh. The agglomerate was then fed into the verticle tube furnace at a temperature of 2200°F., where the agglomerate was expanded and the expanded material was carried from the furnace after a residence time of about 50 to 60 seconds. The expanded particles were recovered and examined. Results of the examination are shown in Table II.

EXAMPLE IV

The fraction of material greater than 270 mesh, including oversize particles, was processed as in Example I. The results are reported in Table II, where it is clearly apparent that the presence of material having a particle size greater than about 200 mesh results in a product having inferior properties.

TABLE II

| Example: | 1 −325 mesh | 2 −270+325 mesh | 3 −200+270 mesh | 4 +270 mesh |
|---|---|---|---|---|
| Liquid lbs/ft³ Displacement | 20.2 | 10.7 | 12.9 | 25.7 |
| $LWD^1$ (lbs/ft³) | 5.6 | 3.9 | 3.0 | 6.2 |
| Friability (%) | 0.0 | 4.0 | 2.0 | 0.0 |
| Surface Area(m²/gr) | 0.1 | 3.92 | 0.51 | 0.1 |
| $MPS^2$(micron) | 120.0 | 125.0 | 145.0 | 75.0 |
| Wall Thickness (micron) | 1.5 | 0.7 | 0.7 | 0.9 |
| Float (%) | 100.0 | 94.9 | 100.0 | 99.0 |
| Sink (%) | Trace | 5.1 | trace | 1.0 |

¹Loose weight density
²Median particle size

What is claimed is:

1. The method of preparing hole-free microspheres of perlitic material comprising reducing said material to a particle size less than about 200 mesh, separating the reduced material into at least one fraction within the size range of from about less than 200 mesh to about less than 325 mesh, and a fraction of more than about 325 mesh, agglomerating the latter fraction with sodium lignosulfonate binder to an aggregate size of less than about 200 mesh, expanding said fractions at a temperature of about 1800° to 2200°F. for a period of about 30 to 60 seconds in a fluidized state and recovering a product comprising a preponderance of individual perlite microspheres having a diameter on the order of from about 10 to about 200 microns and a wall thickness of from about 0.7 to about 1.5 microns.

2. The method of claim 1 wherein said fraction of less than about 325 mesh is expanded at a temperature of about 2200°F for a period of about 50 to 60 seconds.

3. The product of the process of claim 1.

* * * * *